US 7,552,050 B2

(12) United States Patent
Matsumoto et al.

(10) Patent No.: US 7,552,050 B2
(45) Date of Patent: Jun. 23, 2009

(54) SPEECH RECOGNITION SYSTEM AND METHOD UTILIZING ADAPTIVE CANCELLATION FOR TALK-BACK VOICE

(75) Inventors: Shuichi Matsumoto, Iwaki (JP); Toru Marumoto, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 817 days.

(21) Appl. No.: 10/835,742

(22) Filed: Apr. 30, 2004

(65) Prior Publication Data
US 2004/0260549 A1 Dec. 23, 2004

(30) Foreign Application Priority Data
May 2, 2003 (JP) .............................. 2003-127378

(51) Int. Cl.
G10L 15/20 (2006.01)
G10L 15/00 (2006.01)
A61F 11/06 (2006.01)
H04B 15/00 (2006.01)
H04R 3/02 (2006.01)
H03G 3/00 (2006.01)
H04M 9/08 (2006.01)
H04M 9/00 (2006.01)
H04M 1/00 (2006.01)

(52) U.S. Cl. ...................... 704/233; 704/231; 381/71.1; 381/94.1; 381/73.1; 381/108; 381/93; 379/406.01; 379/406.08; 379/406.05; 379/388.07; 379/388.03; 455/570; 455/501

(58) Field of Classification Search ................. 704/231, 704/233; 379/406.01, 406.08, 406.05, 388; 381/108, 321, 93
See application file for complete search history.

(56) References Cited
U.S. PATENT DOCUMENTS
5,241,692 A * 8/1993 Harrison et al. ............... 455/79
(Continued)

FOREIGN PATENT DOCUMENTS
JP         05-022779        1/1993
(Continued)

OTHER PUBLICATIONS

European Search Report; Oct. 26, 2004; L. Krembel, Examiner; 2 pages; Munich, Germany.

*Primary Examiner*—Patrick N Edouard
*Assistant Examiner*—Paras Shah
(74) *Attorney, Agent, or Firm*—Brinks Hofer Gilson & Lione (57) ABSTRACT

A voice recognition system includes an adaptive filter and a subtractor. The adaptive filter generates a simulated talk-back voice y(n) by setting a filter coefficient simulating a transfer system in which an input voice corresponding to a voice command and a talk-back voice output from a speaker are input into a microphone and by filtering a talk-back voice x(n). The subtractor extracts the input voice by subtracting the simulated talk-back voice y(n) from mixed sound input into the microphone. With this configuration, the talk-back voice is attenuated from the mixed sound including the input voice and the talk-back voice input tedinto the microphone, and then, the mixed sound is supplied to a voice recognition engine. Accordingly, the user can input his/her voice during a talk-back operation without the need to interrupt it by pressing a speech button every time the user wishes to input the voice. The voice recognition operation time can be thus reduced.

6 Claims, 7 Drawing Sheets

U.S. PATENT DOCUMENTS

| | | | | |
|---|---|---|---|---|
| 5,412,735 A * | 5/1995 | Engebretson et al. | | 381/317 |
| 5,548,681 A | 8/1996 | Gleaves et al. | | |
| 5,615,270 A * | 3/1997 | Miller et al. | | 381/57 |
| 5,664,019 A * | 9/1997 | Wang et al. | | 381/71.1 |
| 5,796,849 A * | 8/1998 | Coleman et al. | | 381/71.8 |
| 5,822,402 A | 10/1998 | Marszalek | | |
| 5,864,804 A | 1/1999 | Kalveram | | |
| 5,907,622 A * | 5/1999 | Dougherty | | 381/57 |
| 6,263,078 B1 * | 7/2001 | McLaughlin et al. | | 379/406.08 |
| 6,700,977 B2 * | 3/2004 | Sugiyama | | 379/406.08 |
| 6,725,193 B1 * | 4/2004 | Makovicka | | 704/233 |
| 6,876,968 B2 * | 4/2005 | Veprek | | 704/258 |
| 7,039,182 B1 * | 5/2006 | Leonidov et al. | | 379/406.05 |
| 7,079,645 B1 * | 7/2006 | Short et al. | | 379/388.03 |
| 7,340,063 B1 * | 3/2008 | Nielsen et al. | | 381/71.11 |
| 7,421,017 B2 * | 9/2008 | Takatsu | | 375/232 |
| 2002/0041678 A1 * | 4/2002 | Basburg-Ertem et al. | | 379/406.01 |
| 2003/0040910 A1 * | 2/2003 | Bruwer | | 704/266 |
| 2003/0069727 A1 * | 4/2003 | Krasny et al. | | 704/228 |
| 2004/0111258 A1 * | 6/2004 | Zangi et al. | | 704/226 |

FOREIGN PATENT DOCUMENTS

JP  08-335094  12/1996

* cited by examiner

SPEECH RECOGNITION SYSTEM AND METHOD UTILIZING ADAPTIVE CANCELLATION FOR TALK-BACK VOICE

RELATED APPLICATION

The present application claims priority to Japanese Patent Application No. 2003-127378, filed Feb. 5, 2003, the entirety of which is hereby incorporated by reference.

BACKGROUND OF THE INVENTION

1. Field of the Invention

The present invention relates to voice recognition systems and methods for recognizing voice commands issued by users so as to control devices, and more particularly, to a voice recognition system having a talk-back function of feeding back the recognized voice to a user.

2. Description of the Related Art

The presently preferred embodiments relate to a voice recognition system that allows a user to input his/her voice to operate a device such as a navigation system, hands-free device, or personal computer mounted in a vehicle. Such a voice recognition system may be used in addition to or instead of a remote control, a touch panel, a keyboard, or a mouse.

In this type of voice recognition system, when a user presses a speech button provided for the system, the system enters a voice recognition mode, the user's input voice is recognized, and a voice command is executed. There are two approaches to inputting voice. In a first approach, when a user presses the speech button once, the system enters the voice recognition mode, and the system instructs the user to input his/her voice when necessary so that the user and the system interactively communicate with each other. In a second approach, every time the user presses the speech button, the user can input his/her voice only for a predetermined time period.

Most of the voice recognition systems have a talk-back function of feeding back the recognized voice to the user via a speaker. The user listens to the talk-back voice to check whether it has been correctly recognized. If the recognition result is wrong, the user inputs his/her voice once again, and if the recognition result is correct, the user supplies the corresponding information to the system. In response to the user's instruction, the voice recognition system performs various controls.

Normally, a plurality of voice commands used in the voice recognition system are divided into a plurality of levels according to the type of operation to be performed on a device to be controlled. For example, to specify a destination in a navigation system by inputting an address, the user inputs the address aloud by dividing it into a plurality of levels, such as "prefecture→city, town (or village)→the rest of the address".

In this case, every time the user inputs his/her voice, the input voice for each level is spoken back, and thus, it takes time to finish the voice input of the complete address of the destination. To overcome this drawback, attempts have been made to reduce the voice recognition time. As one example, Japanese Unexamined Patent Application Publication No. 6-149287 discloses a system in which the voice recognition time is reduced by decreasing the computation amount of a talk-back voice.

Figure 4A:
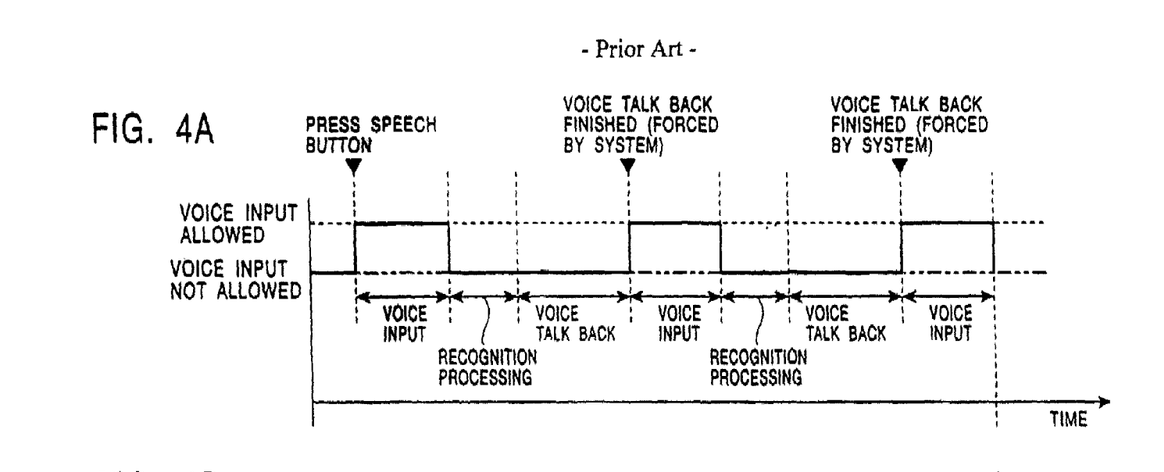
FIG. 4A is a timing chart illustrating the voice input enable state of a known voice recognition system.

In known voice recognition systems, however, while a talk-back voice is outputted, the next voice input is not accepted. If the talk-back voice is mixed with a voice input by a user, incorrect recognition of the input voice is likely to occur. FIG. 4A illustrates a timing chart of the voice input enable state in a known voice recognition system. In FIG. 4A, the above-described first approach is adopted to input the voice.

As shown in FIG. 4A, in the first approach, when the user first presses the speech button, the system enters the voice recognition state to receive the voice input for a predetermined time period. During this period, the user inputs desired voice commands. After the user inputs the voice, the voice recognition system recognizes the input voice and outputs a talk-back voice. During this period, voice input is not accepted. After the talk-back operation, the system once again enters the voice input enable state to enable the user to input his/her voice.

Accordingly, in this first approach, the user cannot input his/her voice while the talk-back operation is being performed. In other words, the user has to wait until the talk-back operation is finished, and thus, it takes time to finish voice input.

In the second approach, the user can press the speech button to interrupt the talk-back operation and continue to input his/her voice. In this case, however, when inputting the voice for a plurality of levels, the user has to press the speech button every time he/she inputs voice for each level, thereby making the operation very complicated.

SUMMARY OF THE INVENTION

Accordingly, in view of the above-described problems, it is an object of the present invention to reduce the voice recognition operation time without the need to perform a complicated operation, such as, pressing a speech button many times.

In order to achieve the above object, according to one embodiment of the present invention, there is provided a voice recognition system having a talk-back function of recognizing a voice input into a microphone and outputting a talk-back voice from a speaker. The voice recognition system includes: an adaptive filter unit for generating a simulated talk-back voice inputted into the microphone by setting a filter coefficient simulating a transfer system in which the talk-back voice outputted from the speaker is inputted into the microphone and by filtering the talk-back voice before being outputted from the speaker; and an input-voice extracting unit for extracting the input voice by subtracting the simulated talk-back voice from sound inputted into the microphone.

According to another embodiment of the present invention, there is provided a voice recognition system having a talk-back function of recognizing a voice input into a microphone and outputting a talk-back voice from a first speaker. The voice recognition system includes: a first adaptive filter unit for generating a simulated talk-back voice inputted into the microphone by setting a first filter coefficient simulating a transfer system in which the talk-back voice outputted from the first speaker is inputted into the microphone and by filtering the talk-back voice before being outputted from the first speaker; a second adaptive filter unit for generating a simulated audio sound inputted into the microphone by setting a second filter coefficient simulating a transfer system in which an audio sound outputted from a second speaker is inputted into the microphone and by filtering the audio sound before being outputted from the second speaker; and an input-voice extracting unit for extracting the input voice by subtracting the simulated talk-back voice and the simulated audio sound from sound inputted into the microphone.

According to still another embodiment of the present invention, there is provided a voice recognition system having a talk-back function of recognizing a voice inputted into a microphone and outputting a talk-back voice from a speaker.

The voice recognition system includes: a first adaptive filter unit for generating a simulated mixed voice inputted into the microphone by setting a first filter coefficient simulating a transfer system in which a mixed voice including the talk-back voice outputted from the speaker and an audio sound are inputted into the microphone and by filtering the mixed voice before being outputted from the speaker; and an input-voice extracting unit for extracting the input voice by subtracting the simulated mixed voice from sound inputted into the microphone.

According to a further embodiment of the present invention, there is provided a voice recognition method including the acts of: setting a voice input state to a disable state in which voice input is not accepted when recognizing a voice input into a microphone by a recognition processor; setting a voice input state to an enable state in which voice input is accepted when starting outputting from a speaker a talk-back voice obtained as a result of recognizing the voice by the recognition processor; generating a simulated talk-back voice to be inputted into the microphone by setting in an adaptive filter unit a filter coefficient simulating a transfer system in which the talk-back voice outputted from the speaker is inputted into the microphone and by filtering the talk-back voice before being outputted from the speaker; and extracting the input voice and supplying the extracted voice to the recognition processor by subtracting the simulated talk-back voice from sound inputted into the microphone when the voice input state is set in the enable state.

According to a yet further embodiment of the present invention, there is provided a voice recognition method including the acts of: setting a voice input state to a disable state in which voice input is not accepted when recognizing a voice input into a microphone by a recognition processor; setting a voice input state to an enable state in which voice input is accepted when starting outputting from a first speaker a talk-back voice as a result of recognizing the voice by the recognition processor; generating a simulated talk-back voice to be inputted into the microphone by setting in a first adaptive filter unit a first filter coefficient simulating a transfer system in which the talk-back voice outputted from the first speaker is inputted into the microphone and by filtering the talk-back voice before being outputted from the first speaker; generating a simulated audio sound to be inputted into the microphone by setting in a second adaptive filter unit a second filter coefficient simulating a transfer system in which an audio sound outputted from a second speaker is inputted into the microphone and by filtering the audio sound before being outputted from the second speaker; and extracting the input voice and supplying the extracted voice to the recognition processor by subtracting the simulated talk-back voice and the simulated audio sound from sound inputted into the microphone when the voice input state is set in the enable state.

According to a further embodiment of the present invention, there is provided a voice recognition method including the acts of: setting a voice input state to a disable state in which voice input is not accepted when recognizing a voice input into a microphone by a recognition processor; setting a voice input state to an enable state in which voice input is accepted when starting outputting from a speaker a talk-back voice obtained as a result of recognizing the voice by the recognition processor; generating a simulated mixed voice to be inputted into the microphone by setting in an adaptive filter unit a filter coefficient simulating a transfer system in which a mixed voice including the talk-back voice and an audio sound output from the speaker is inputted into the microphone and by filtering the mixed voice before being outputted from the speaker; and extracting the input voice and supplying the extracted voice to the recognition processor by subtracting the simulated mixed voice from sound inputted into the microphone when the voice input state is set in the enable state.

According to the presently preferred embodiments of the present invention, a talk-back voice outputted from a speaker and inputted into a microphone is estimated by the adaptive filter unit. The estimated value of the talk-back voice is then subtracted from sound inputted into the microphone. Thus, only the input voice can be extracted from the sound including the input voice and other sound. With this configuration, the user can input his/her voice at any time even during the talk-back operation without performing a complicated operation, for example, interrupting the talk-back operation by inputting a speech button every time the user wishes to input voice. As a result, the voice recognition operation time can be reduced.

DETAILED DESCRIPTION OF THE DRAWINGS AND THE PRESENTLY PREFERRED EMBODIMENTS

The preferred embodiments of the present invention are described in detail below with reference to the accompanying drawings through illustration of preferred embodiments.

First Embodiment

A voice recognition system 100 constructed in accordance with a first embodiment of the present invention is described below with reference to FIGS. 1 through 4.

Figure 1:
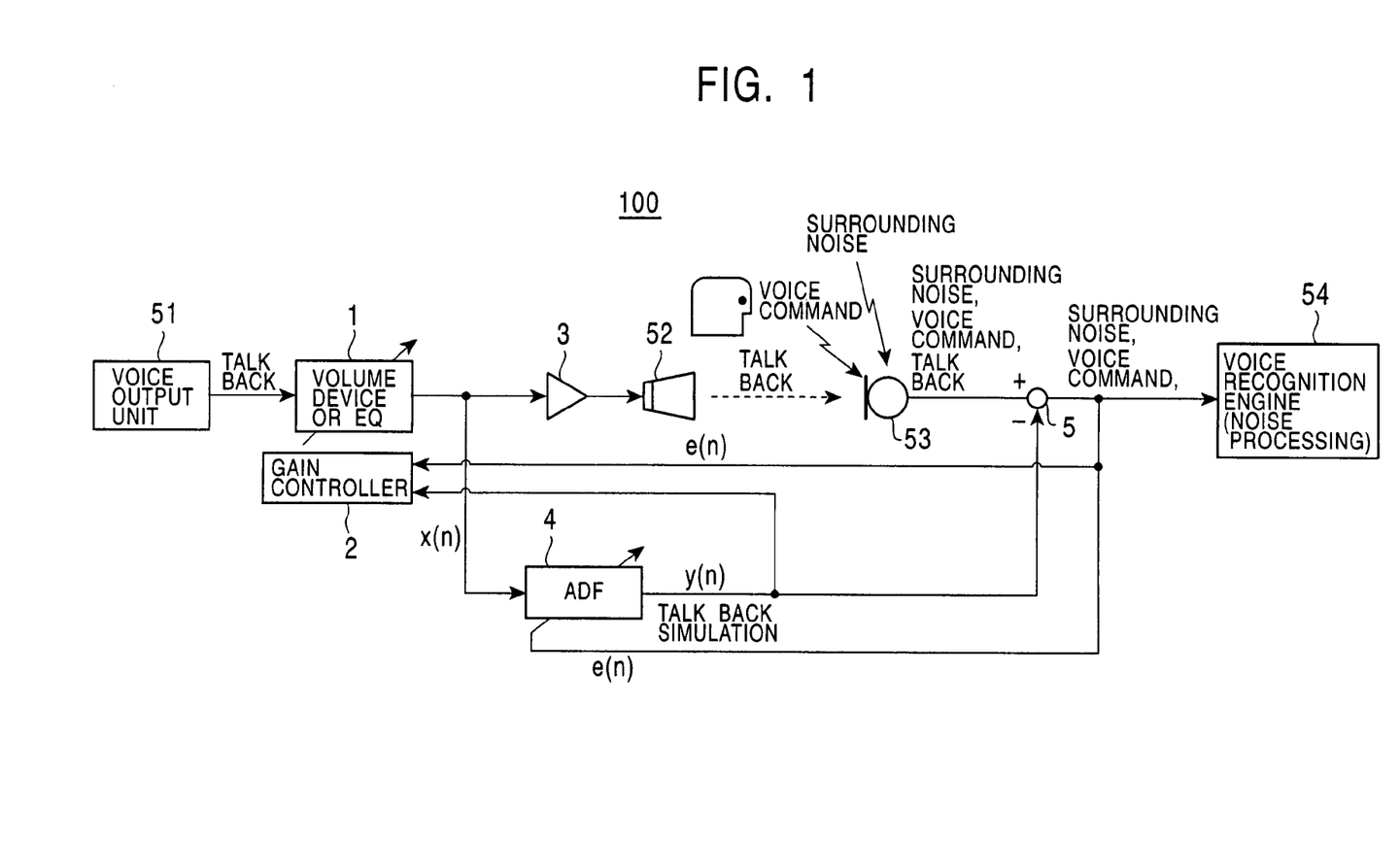
FIG. 1 is a block diagram illustrating elements of a voice recognition system according to a first embodiment of the present invention.

In FIG. 1, the voice recognition system 100 includes a volume device or an equalizer (hereinafter referred to as the "volume device") 1, a gain controller 2, an output amplifier 3, an adaptive filter (ADF) 4, a subtractor 5, a voice output unit 51, a speaker 52, a microphone 53, and a voice recognition engine 54.

The voice output unit 51 generates a talk-back voice and outputs it. The gain of the talk-back voice is then controlled in the volume device 1 and the resulting talk-back voice is amplified in the output amplifier 3, and then, it is outputted from the speaker 52. The microphone 53 is used for inputting the user's voice. In practice, however, a talk-back voice and surrounding noise, for example, engine noise (noise occurring when a vehicle is running), and output from the speaker 52 are also inputted into the microphone 53. The voice recognition engine 54 recognizes the input voice from the microphone 53 and executes a command corresponding to the input voice for a device to be controlled (not shown), for example, a navigation system.

Figure 2:
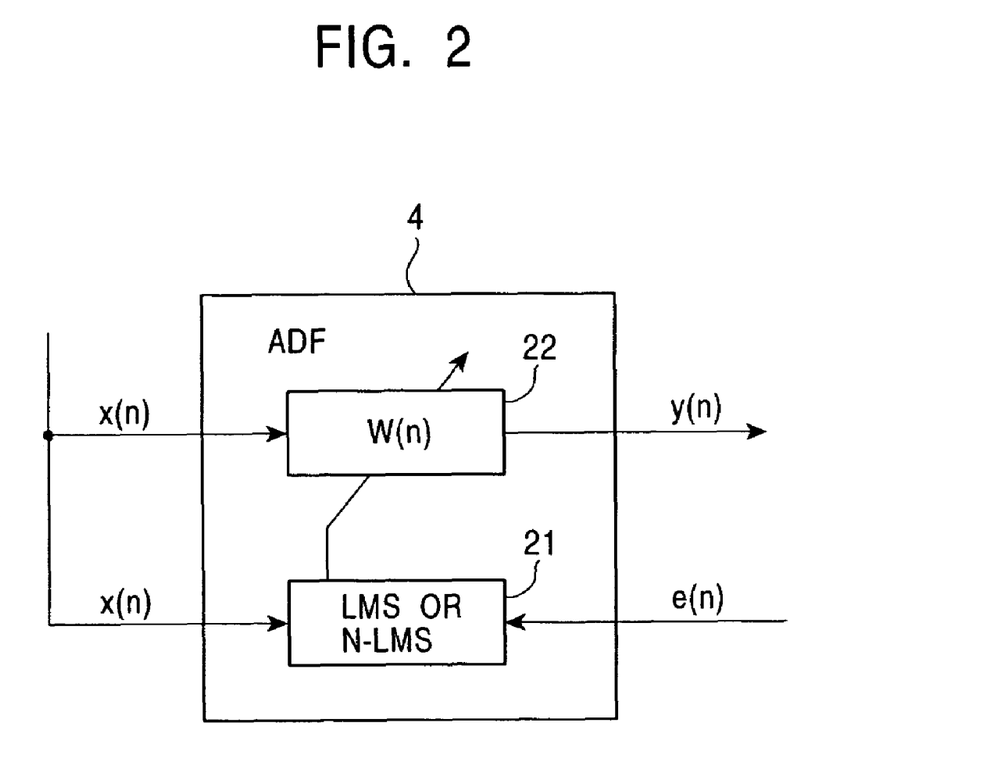
FIG. 2 illustrates the configuration of an adaptive filter used in the voice recognition system shown in FIG. 1.

The adaptive filter 4 includes, as shown in FIG. 2, a coefficient identification unit 21 and a voice correction filter 22. The coefficient identification unit 21 is a filter for identifying the transfer function (the filter coefficient of the voice correction filter 22) of the acoustic system from the speaker 52 to the microphone 53, and more specifically, the coefficient identification unit 21 is an adaptive filter using the least mean square (LMS) algorithm or normalized-LMS (N-LMS) algorithm. The coefficient identification unit 21 is operated so that the power of the error e(n) output from the subtractor 5 is minimized so as to identify the impulse response of the acoustic system.

The voice correction filter 22 performs convolutional computation by using the filter coefficient w(n) determined by the coefficient identification unit 21 and a talk-back voice x(n) to be controlled so as to supply the same transfer characteristic as that of the acoustic system to the talk-back voice x(n). As a result, a simulated talk-back voice y(n) simulating the talk-back voice inputted into the microphone 53 is generated. The adaptive filter 4 may also be referred to as an adaptive filter unit.

The subtractor 5 subtracts the simulated talk-back voice y(n) generated by the adaptive filter 4 from the voice (mixed voice including the voice command, talk-back voice, and surrounding noise) inputted into the microphone 53 so as to extract the voice command (input voice) and surrounding noise (for example, engine noise). The subtractor 5 may be referred to as an input-voice extracting unit.

The mixed voice including the input voice and surrounding noise extracted by the subtractor 5 is supplied to the voice recognition engine 54. After performing typical noise processing, for example, filter processing or spectrum subtraction, the voice recognition engine 54 recognizes the voice command. The mixed voice extracted by the subtractor 5 is also fed back to the coefficient identification unit 21 of the adaptive filter 4 and the gain controller 2 as the error e(n).

Based on the simulated talk-back voice y(n) output from the adaptive filter 4 and the mixed voice e(n) including the input voice and surrounding noise outputted from the subtractor 5, the gain controller 2 calculates the optimal gain to be added to the talk-back voice output from the voice output unit 51, and outputs the calculated gain to the volume device 1. In this case, the mixed voice e(n) is considered as noise for the talk-back voice, and the gain of the talk-back voice to be outputted from the speaker 52 is adjusted so that the talk-back voice can be articulated to the user.

The volume device 1 performs gain correction for the talk-back voice outputted from the voice output unit 51. More specifically, the volume device 1 corrects for the talk-back voice outputted from the voice output unit 51 by supplying the gain calculated by the gain controller 2 to the talk-back voice. This correction is conducted for, for example, each of a plurality of divided frequency bands.

The operation of the voice recognition system 100 configured as described above is briefly described. The gain of the talk-back voice outputted from the voice output unit 51 is adjusted by the volume device 1 and the gain controller 2 so as to improve the articulation of the talk-back voice. The talk-back voice outputted from the volume device 1 is amplified in the output amplifier 3 at a predetermined magnifying power, and is then outputted from the speaker 52.

The talk-back voice outputted from the speaker 52 is inputted into the microphone 53. In this case, if the user issues a voice command, the voice command is also inputted into the microphone 53, and if the vehicle is running, surrounding noise, for example, engine sound or load noise, is also inputted into the microphone 53. Accordingly, the talk-back voice, input voice, and surrounding noise are inputted into the microphone 53 in a mixed manner. This mixed voice is inputted into the positive terminal of the subtractor 5. Meanwhile, the simulated talk-back voice (estimated value of the talk-back voice) generated by the adaptive filter 4 is inputted into the negative terminal of the subtractor 5.

The subtractor 5 subtracts the simulated talk-back voice outputted from the adaptive filter 4 from the mixed voice output from the microphone 53 to calculate the error and extract the input voice and surrounding noise. The extracted input voice and surrounding noise are supplied to the voice recognition engine 54. The voice recognition engine 54 then performs noise reduction and voice-command recognition. The extracted input voice and surrounding noise are fed back to the gain controller 2 and the adaptive filter 4 so that they can be used for improving the articulation of the talk-back voice and for calculating the estimated value of the talk-back voice.

Figure 3:
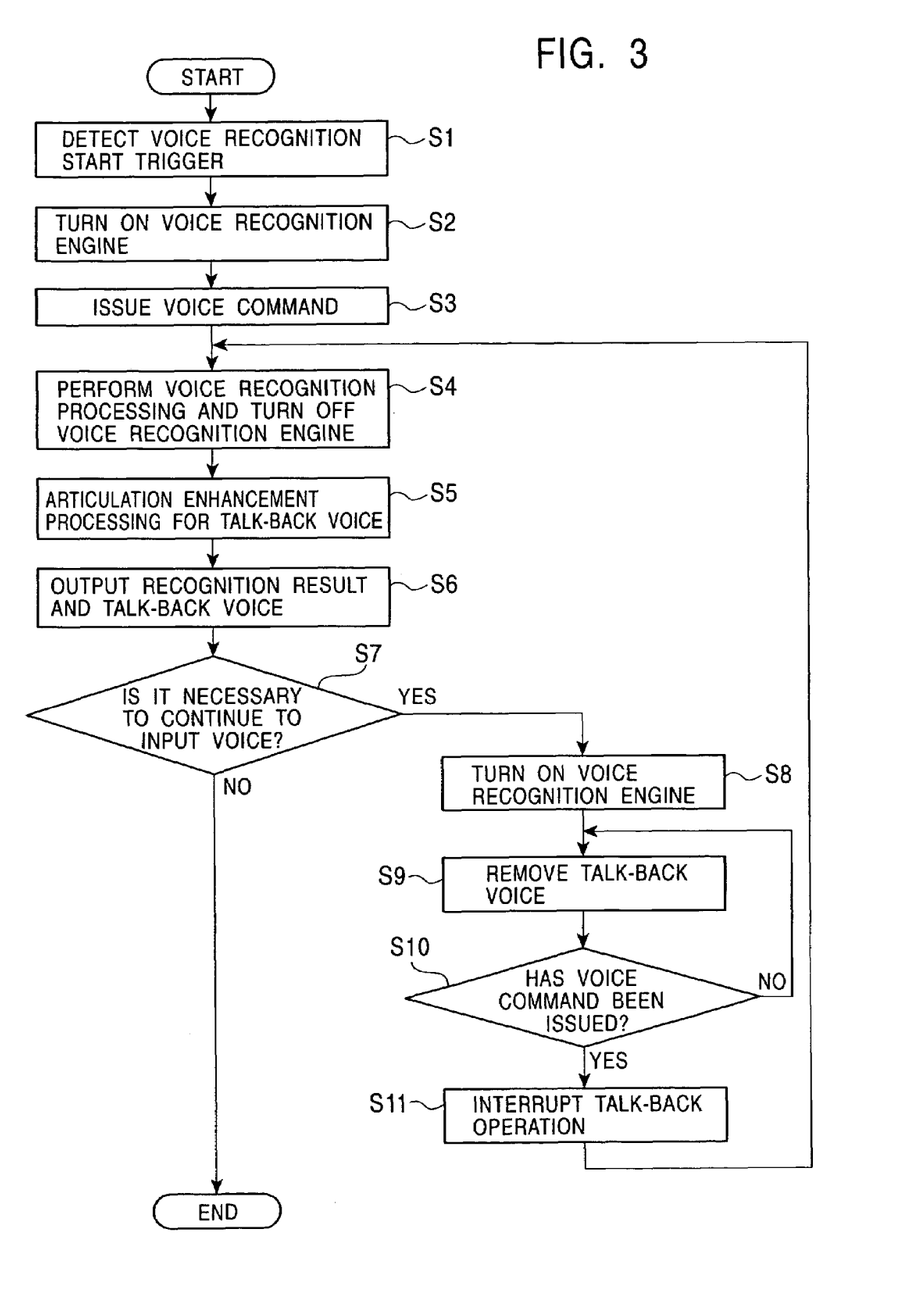
FIG. 3 is a flowchart illustrating the voice recognition processing performed by the voice recognition system shown in FIG. 1.

FIG. 3 is a flowchart illustrating the voice recognition processing performed by the voice recognition system 100 shown in FIG. 1 of the first embodiment. Although it is not shown in FIG. 1, the voice recognition system 100 is provided with a controller for controlling the entire voice recognition operation. The flowchart of FIG. 3 is executed under the control of this controller.

In act S1, the controller detects a voice recognition start trigger (for example, an operation for pressing the speech button or voice input of a predetermined keyword). Then, in act S2, the controller turns on the voice recognition engine 54 so that the system enters the voice input enable state. In this state, in act S3, the user inputs a first command, which is the topmost level of voice commands consisting of a plurality of levels.

The issued voice command is inputted into the microphone 53, and is supplied to the voice recognition engine 54 via the subtractor 5. Then, in act S4, the voice recognition engine 54 performs voice recognition processing (including noise reduction). In this case, the controller turns off the voice recognition engine 54 to cancel the voice input enable state. In act S5, the volume device 1 and the gain controller 2 start improving the articulation of the talk-back voice. In this state, in act S6, the voice output unit 51 starts outputting a recognition result obtained from the voice recognition engine 54 and a talk-back voice.

In act S7, the controller determines during this talk-back operation whether it is necessary to continue to input voice by, for example, shifting to a lower level of commands. If the outcome of act S7 is yes, the process proceeds to act S8 in which the controller turns on the voice recognition engine 54 again so that the system enters the voice input enable state. Subsequently, in act S9, the subtractor 5 obtains the estimated value of the talk-back voice output in act S6 from the adaptive filter 4, and subtracts the estimated value from the input voice from the microphone 53 so as to remove the talk-back voice from the input voice.

The controller then determines in act S10 whether a voice command has been issued. If a voice command is not issued, the process returns to act S9, and the loop operation is repeated until a voice command is issued. If a voice command is not issued for a predetermined period, the time-out processing is performed. If a voice command is issued in act S10, the process proceeds to act S11 in which the controller interrupts the talk-back operation, and returns to act S4. In this process, the talk-back operation is interrupted when a voice command is issued. It is not essential, however, that the talk-back operation be interrupted since the talk-back voice has been removed from the input voice.

Figure 4B:
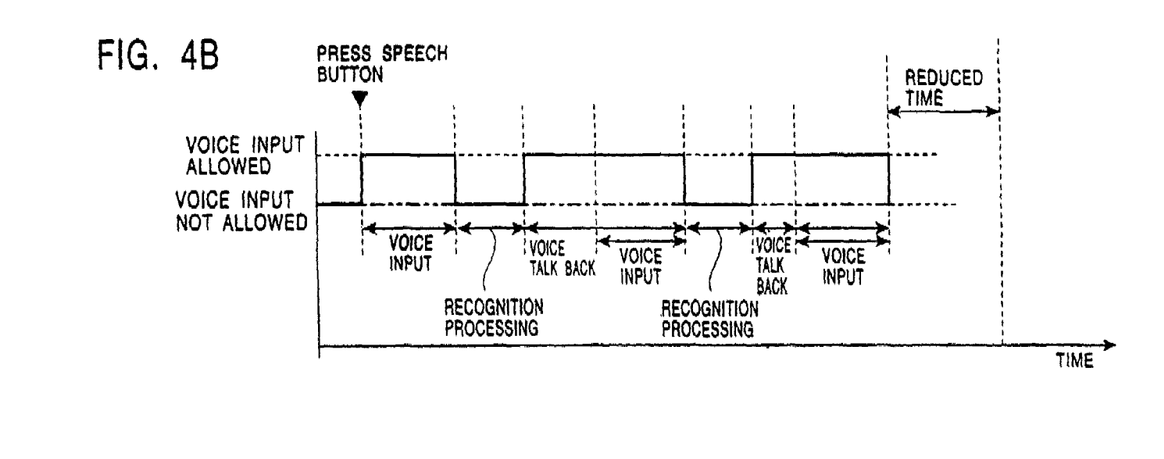
FIG. 4B is a timing chart illustrating the voice input enable state of the voice recognition system of the first embodiment.

FIG. 4B is a timing chart illustrating a change in the voice input enable state of the voice recognition system 100 of this embodiment in comparison with that of a known voice recognition system shown in FIG. 4A. The operation of the known voice recognition system has been discussed above.

As shown in FIG. 4B, in this embodiment, when the user first presses the speech button, the system enters the voice recognition mode to enable the user to input voice for a predetermined time period. During this period, the user issues desired voice commands. When a voice command is issued, the input voice is recognized, and a talk-back voice is outputted. The operation up to this stage is the same as that of the known voice recognition system shown in FIG. 4A.

In the known voice recognition system shown in FIG. 4A, the user is not allowed to input voice during the talk-back operation. Conversely, in this embodiment shown in FIG. 4B, when the recognition of the input voice is finished, the system automatically enters the voice input enable state. This enables the user to continue to input his/her voice at any time without having to wait until the talk-back operation is finished. As a result, the waiting time can be reduced.

As described in detail above, according to the first embodiment, voice input can be accepted when necessary even during a talk-back operation, and a user is able to input his/her voice at any time without having to wait until the talk-back operation is finished. Thus, the voice recognition operation time can be reduced. Additionally, the user does not have to press the speech button every time he/she issues a voice command, thereby eliminating a complicated operation.

In the first embodiment, by using the simulated talk-back voice estimated in the adaptive filter 4, which is provided for enhancing the articulation of the talk-back voice, the talk-back voice is removed from the input voice from the microphone 53. This eliminates the need to separately provide a dedicated adaptive filter. Thus, the articulation of the talk-back voice can be enhanced, and also, the voice recognition operation time can be reduced without increasing the cost.

Second Embodiment

Figure 5:
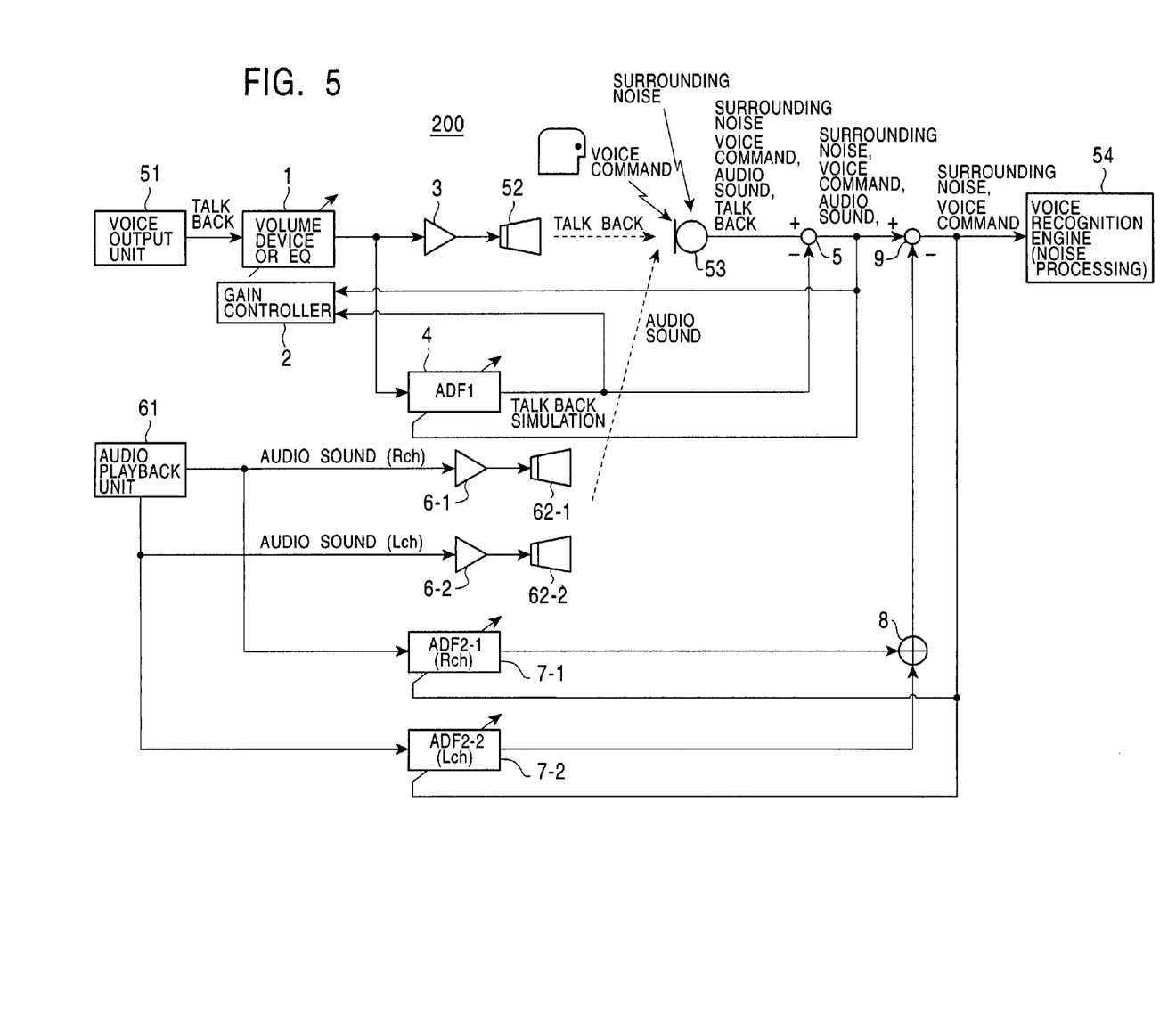
FIG. 5 is a block diagram illustrating elements of a voice recognition system according to a second embodiment of the present invention.

A voice recognition system 200 constructed in accordance with a second embodiment of the present invention is described below with reference to FIGS. 5 and 6. FIG. 5 is a block diagram illustrating elements of the voice recognition system 200. In FIG. 5, elements having the same functions as those of the elements in FIG. 1 are indicated by like reference numerals, and an explanation thereof is thus omitted.

In addition to the elements of the voice recognition system 100 shown in FIG. 1, the voice recognition system 200 includes, as shown in FIG. 5, output amplifiers 6-1 and 6-2, second adaptive filters 7-1 and 7-2, an adder 8, a subtractor 9, an audio playback unit 61, and speakers 62-1 and 62-2 having a plurality of channels (right channel and left channel).

The audio playback unit 61 plays back various audio sources, for example, compact discs (CDs), Mini Discs (MDs), digital versatile disks (DVDs), and radio broadcasts. The output amplifiers 6-1 and 6-2 amplify audio sounds of the right and left channels played back by the audio playback unit 61 at a predetermined amplifying factor, and supply the amplified audio sounds to the speakers 62-1 and 62-2, respectively. The audio sounds are then outputted from the speakers 62-1 and 62-2 to the microphone 53 together with an input voice and a talk-back voice outputted from the speaker 52.

The second adaptive filters 7-1 and 7-2 are configured, as shown in FIG. 2, similarly to the adaptive filter 4. The second adaptive filter 7-1 identifies the filter coefficient simulating the transfer system from the right-channel speaker 62-1 to the microphone 53, and performs filter processing on the right-channel audio sound to generate a simulated right-channel audio sound.

The other second adaptive filter 7-2 identifies the filter coefficient simulating the transfer system from the left-channel speaker 62-2 to the microphone 53, and performs filter processing on the left-channel audio sound to generate a simulated left-channel audio sound.

In the second embodiment, the adaptive filter 4 forms the first adaptive filter unit, and the second adaptive filters 7-1 and 7-2 form the second adaptive filter unit. The adder 8 adds the simulated right-channel and left-channel audio sounds outputted from the second adaptive filters 7-1 and 7-2, and outputs the added simulated sound to the subtractor 9.

In this embodiment, the subtractor 5 subtracts a simulated talk-back voice generated by the adaptive filter 4 from a voice (mixed voice including a voice command, talk-back voice, audio sound, and surrounding noise) inputted into the microphone 53 so as to extract the voice command, audio sound, and surrounding noise. The subtractor 9 further subtracts the simulated audio sound generated by the second adaptive filters 7-1 and 7-2 and the adder 8 from the voice outputted from the subtractor 5 so as to extract the voice command (input voice) and surrounding noise. The subtractors 5 and 9 may be referred to as the input-voice extracting unit.

The voice recognition engine 54 reduce the surrounding noise contained in the mixed voice extracted by the subtractor 5 to recognize only the voice command. The mixed voice extracted by the subtractor 5 is also fed back to the gain controller 2 and the adaptive filter 4. The mixed voice extracted by the subtractor 9 is supplied to the voice recognition engine 54 and is also fed back to the second adaptive filters 7-1 and 7-2.

The operation of the voice recognition system 200 configured as described above is briefly discussed below. The gain of the talk-back voice outputted from the voice output unit 51 is adjusted by the volume device 1 and the gain controller 2 so as to improve the articulation of the talk-back voice. The talk-back voice output from the volume device 1 is then amplified in the output amplifier 3 at a predetermined amplifying factor and is then outputted from the speaker 52.

The audio sounds output from the audio playback unit 61 are amplified in the output amplifiers 6-1 and 6-2, and are then outputted from the speakers 62-1 and 62-2, respectively.

The talk-back voice output from the speaker 52 and the audio sounds output from the speakers 62-1 and 62-2 are inputted into the microphone 53. In this case, if the user issues a voice command, it is also inputted into the microphone 53, and if the vehicle is running, surrounding noise, for example, engine sound or load noise, is also inputted into the microphone 53. Accordingly, the talk-back voice, audio sounds, input voice, and surrounding noise are inputted into the microphone 53 in a mixed manner.

This mixed voice is inputted into the positive terminal of the subtractor 5. Meanwhile, the simulated talk-back voice generated by the adaptive filter 4 is inputted into the negative terminal of the subtractor 5. The subtractor 5 subtracts the simulated talk-back voice output from the adaptive filter 4 from the mixed voice output from the microphone 53 so as to calculate the error and extract the audio sounds, input voice, and surrounding noise.

The mixed voice including the audio sounds, input voice, and surrounding noise extracted by the subtractor 5 is inputted into the positive terminal of the subtractor 9. Meanwhile, the simulated audio sound generated by the second adaptive filters 7-1 and 7-2 and the adder 8 is inputted into the negative terminal of the subtractor 9. The subtractor 9 subtracts the simulated audio sound output from the adder 8 from the mixed voice output from the subtractor 5 to calculate the error and extract the input voice and surrounding noise.

The extracted input voice and surrounding noise are supplied to the voice recognition engine 54. The voice recognition engine 54 reduces the surrounding noise and recognizes the voice command. The audio sounds, input voice, and surrounding noise extracted by the subtractor 5 are also fed back to the gain controller 2 and the adaptive filter 4 and are used for enhancing the articulation of the talk-back voice and for estimating the talk-back voice. The input voice and surrounding noise extracted by the subtractor 9 are also fed back to the second adaptive filters 7-1 and 7-2 and are used for estimating the audio sound.

Figure 6:
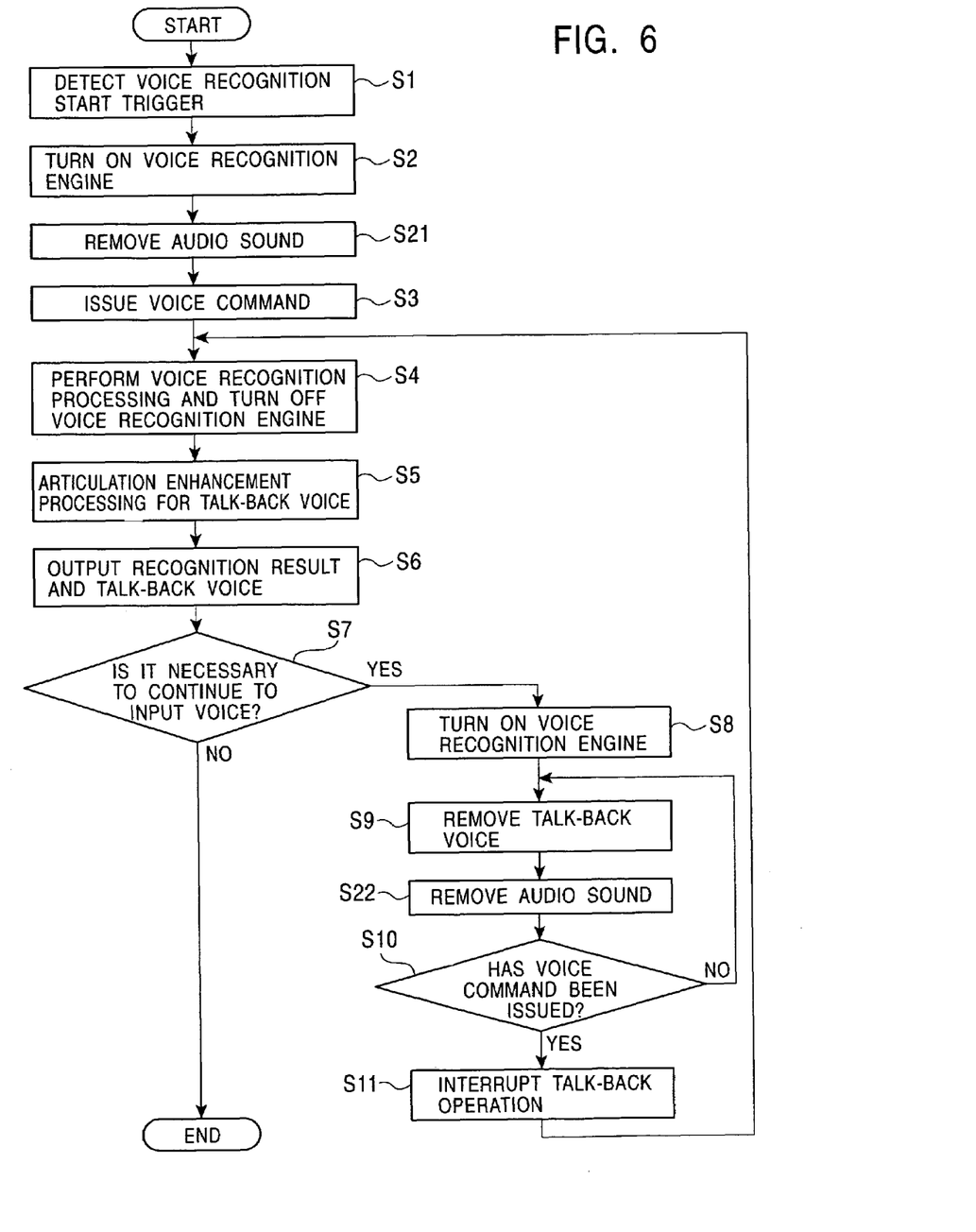
FIG. 6 is a flowchart illustrating the voice recognition processing performed by the voice recognition system shown in FIG. 5.

FIG. 6 is a flowchart illustrating the voice recognition processing performed by the voice recognition system 200 of the second embodiment. In FIG. 6, the same process steps as those of FIG. 3 are indicated by like step numbers, and an explanation thereof is thus omitted. The process different from that of FIG. 3 is in that acts S21 and S22 (removing audio sound) are inserted between acts S2 and S3 and between acts S9 and S10, respectively.

In acts S21 and S22, the estimated value of audio sound outputted from the adder 8 is subtracted by the subtractor 9 from the mixed voice, including the audio sound, input voice, and surrounding noise, outputted from the subtractor 5 to remove the audio sound from the mixed voice. The input voice and surrounding noise are then extracted.

As described in detail above, according to the second embodiment, even if a voice is inputted during the talk-back operation and audio playback operation, the talk-back voice and audio sound are removed from the input voice outputted from the microphone so as to extract the input voice and surrounding noise. The extracted input voice and surrounding noise are then supplied to the voice recognition engine 54. Accordingly, even while the talk-back operation and audio playback operation are being performed, the user can input voice at any time, thereby reducing the voice recognition operation time.

Third Embodiment

A voice recognition system 300 constructed in accordance with a third embodiment of the present invention is now described with reference to FIG. 7. Elements having the same functions as those of the elements shown in FIG. 5 are designated with like reference numerals, and an explanation thereof is thus omitted.

In the second embodiment shown in FIG. 5, the talk-back voice and the audio sound are outputted to the different elements. In contrast, in the third embodiment shown in FIG. 7, a talk-back voice and audio sound are outputted to the same element.

Figure 7:
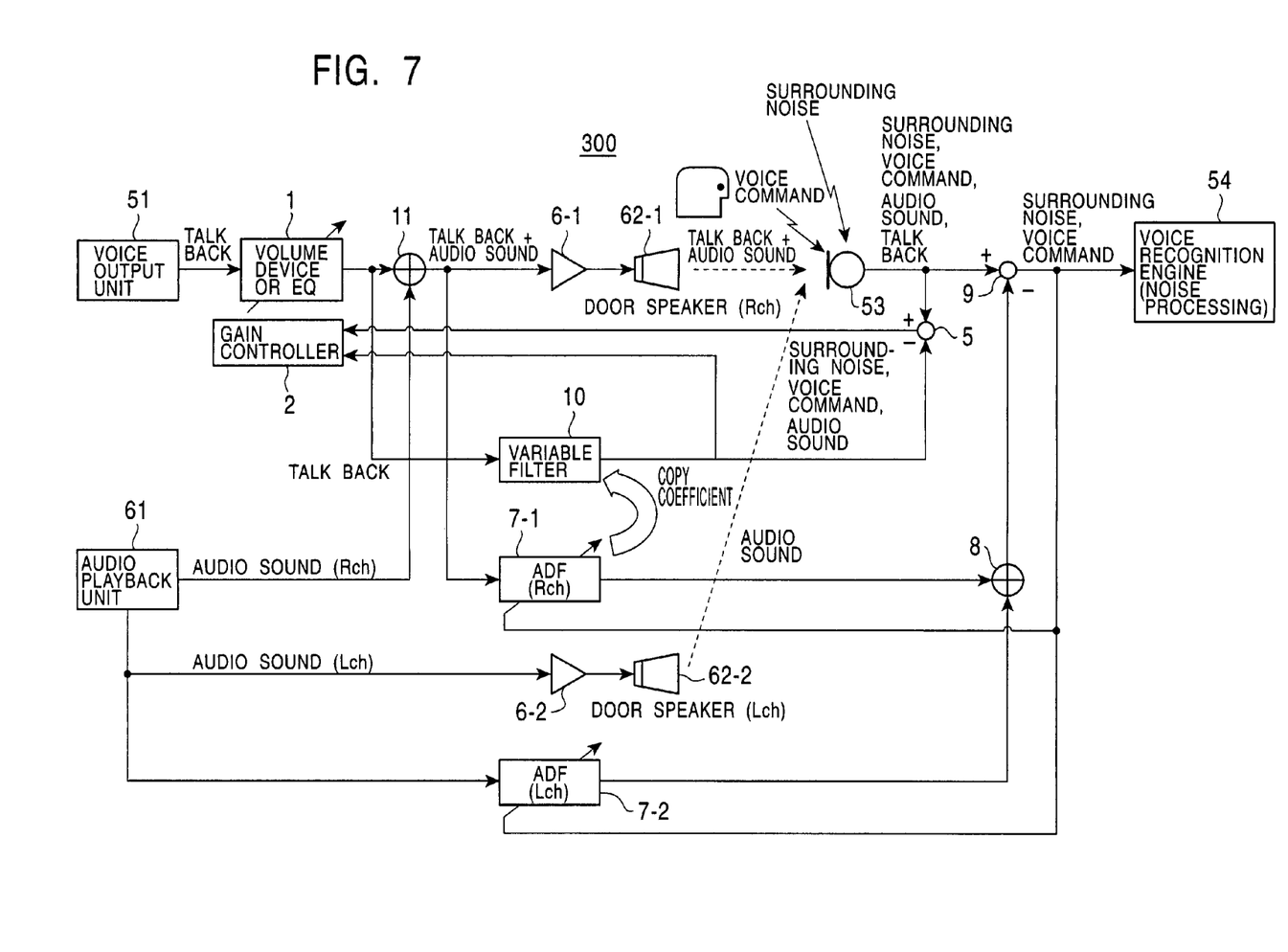
FIG. 7 is a block diagram illustrating the essential elements of a voice recognition system according to a third embodiment of the present invention.

In the voice recognition system 300 shown in FIG. 7, the output amplifier 3 shown in FIG. 5 is eliminated, and only two output amplifiers 6-1 and 6-2 are provided. Also, instead of the adaptive filter 4 shown in FIG. 5, a variable filter 10 is provided, and an adder 11 is further provided. The other elements are similar to those of FIG. 5.

In FIG. 7, the adder 11 adds a talk-back voice outputted from the volume device 1 and a right-channel audio sound played back by the audio playback unit 61, and outputs the mixed voice to the output amplifier 6-1 and the adaptive filter 7-1. The output amplifier 6-1 amplifies the voice outputted from the adder 11 at a predetermined amplifying factor, and outputs the amplified voice from the right-channel speaker 62-1.

The adaptive filter 7-1 identifies the filter coefficient simulating the transfer system from the right-channel speaker 62-1 to the microphone 53. By using this identified filter coefficient, the adaptive filter 7-1 filters the mixed voice including the talk-back voice and the right-channel audio sound outputted from the adder 11 to generate a simulated mixed voice.

The variable filter 10, which is a voice correction filter, copies the filter coefficient identified by the adaptive filter 7-1 to the variable filter 10, the filter coefficient set in the variable filter 10 being variable. The variable filter 10 filters the talk-back voice outputted from the volume device 1 to generate a simulated talk-back voice to be inputted into the microphone 53.

The right-channel adaptive filter 7-1, which is the copy source of the filter coefficient to be inputted into the variable filter 10, simulates the transfer system from the right-channel speaker 62-1, which outputs the talk-back voice, to the microphone 53. If, for example, the voice recognition system 300 of this embodiment is used in a navigation system, the talk-back voice is outputted from the right-channel speaker 62-1 installed near the driver's seat, and the microphone 53 receiving this talk-back voice is also installed near the driver's seat. In this case, it is thus preferable that the filter coefficient of the right-channel adaptive filter 7-1 be copied into the variable filter 10. If the driver's seat is at the left side of the vehicle, it is preferable that the filter coefficient of the left-channel adaptive filter 7-2 be copied into the variable filter 10.

The operation performed by the voice recognition system 300 of the third embodiment is briefly discussed below. The gain of the talk-back voice outputted from the voice output unit 51 is adjusted by the volume device 1 and the gain controller 2 so as to improve the articulation of the talk-back voice.

The talk-back voice output from the volume device 1 is added to the right-channel audio sound played back by the audio playback unit 61 in the adder 11, and the mixed voice is then amplified in the output amplifier 6-1 at a predetermined amplifying factor and is then outputted from the speaker 62-1. The left-channel audio sound played back by the audio playback unit 61 is amplified in the outputted amplifier 6-2 at a predetermined amplifying factor and is then outputted from the speaker 62-2.

The voice (including the talk-back voice and right-channel audio sound) output from the speaker 62-1 and the left-channel audio sound output from the speaker 62-2 are inputted into the microphone 53. In this case, if the user issues a voice command, it is also inputted into the microphone 53, and if the vehicle is running, surrounding noise, for example, engine sound or load noise, is also inputted into the microphone 53. Accordingly, the talk-back voice, left-channel and right-channel audio sounds, input voice, and surrounding noise are inputted into the microphone 53 in a mixed manner.

This mixed voice is inputted into the positive terminals of the subtractors 5 and 9. Meanwhile, the simulated talk-back voice generated by the variable filter 10 is inputted into the negative terminal of the subtractor 5. The subtractor 5 subtracts the simulated talk-back voice output from the variable filter 10 from the mixed voice output from the microphone 53 so as to calculate the error and extract the audio sound, input voice, and surrounding noise. The extracted mixed voice is fed back to the gain controller 2 and is used for enhancing the articulation of the talk-back voice.

The mixed voice including the talk-back voice and right-channel audio sound output from the adder 11 is also inputted into the adaptive filter 7-1. The adaptive filter 7-1 then generates a simulated voice including the talk-back voice and right-channel audio sound. Meanwhile, a simulated left-channel audio sound is generated in the adaptive filter 7-2.

The simulated right-channel and left-channel audio sounds generated by the adaptive filters 7-1 and 7-2, respectively, are added in the adder 8, and the added simulated audio sound is inputted into the negative terminal of the subtractor 9. The subtractor 9 subtracts the simulated voice including the talk-back voice and audio sound output from the adder 8 from the mixed voice output from the subtractor 5 so as to calculate the error and extract the input voice and surrounding noise.

The input voice and surrounding noise extracted by the subtractor 9 are supplied to the voice recognition engine 54. The voice recognition engine 54 reduces noise to recognize the voice command (input voice). The input voice and surrounding noise extracted by the subtractor 9 are also fed back to the adaptive filters 7-1 and 7-2 and are used for estimating the audio sound.

The voice recognition processing performed by the voice recognition system 300 of the third embodiment is similar to that shown in FIG. 6, and an explanation thereof is thus omitted.

As described in detail above, as in the second embodiment, according to the third embodiment, voice input is accepted during the talk-back operation and audio playback operation when necessary, and the user can input his/her voice at any time during this period. In the third embodiment, it is not necessary to provide advanced adaptive filters containing algorithms for identifying filter coefficients in order to estimate a talk-back voice, thereby reducing the cost. The variable filter 10 does not have to perform computation for identifying filter coefficients because it copies the filter coefficient from the adaptive filter 7-1, thereby reducing the processing load.

While the present invention has been described with reference to the above-described embodiments, these embodiments are examples only to carry out the invention, and the technical scope of the invention should not be restricted by these embodiments. Various modifications and changes can be made to the present invention without departing from the spirit or major features of the invention.

The invention claimed is:

1. A voice recognition system, comprising:
a microphone configured for receiving a mixed voice input;
a plurality of speakers, wherein at least one speaker is configured for generating a talk-back voice, and at least one speaker is not configured for generating a talk-back voice;
at least one adaptive filter unit in communication with at least one speaker in the plurality of speakers that is not configured for generating a talk-back voice, and configured for generating a simulated mixed voice to be received by the microphone by setting a first filter coefficient;
a variable filter unit in communication with the at least one speaker in the plurality of speakers that is configured for generating a talk-back voice, wherein the variable filter unit is configured for copying only the filter coefficient set by the at least one adaptive filter unit in communication with the speaker located closest in proximity to the microphone in the plurality of speakers that is not configured to generate a talk-back voice; and
an input-voice extracting unit configured for extracting an input voice by subtracting the simulated mixed voice from the mixed voice input received by the microphone; and
a gain controller connected with the adaptive filter unit and the input-voice extracting unit, and configured for receiving the mixed voice input received by the microphone and the output from the at least one adaptive filter unit, and to increase the volume of the talk-back voice to be provided to the at least one speaker in the plurality of speakers based on the mixed voice input and the output of the adaptive filter unit, wherein the volume is increased to compensate for the surrounding noise and the talk-back voice of the mixed voice input received by the microphone such that the talk-back voice can be articulated to the user;
wherein the at least one adaptive filter unit is configured for filtering the talk-back voice prior to output by the speaker.

2. The voice recognition system of claim 1, further comprising a second adaptive filter unit in communication with the at least one speaker that is not configured for generating a talk-back voice, and configured for generating a simulated audio sound to be inputted into the microphone by setting a second filter coefficient that is distinct from the first filter coefficient, wherein the input-voice extracting unit is configured for extracting the input voice by subtracting the simulated mixed voice and the simulated audio sound from the mixed voice input received by the microphone.

3. The voice recognition system of claim 1, wherein the plurality of speakers is divided into a driver side channel and a non-driver side channel, and the at least one speaker that is configured for generating a talk-back voice is located on the driver side channel, and at least one speaker that is not configured for generating a talk-back voice is located on the non-driver side channel.

4. A voice recognition method comprising the acts of:
providing a voice recognition engine;
providing a microphone;
providing a plurality of speakers, wherein at least one of the plurality of speakers generates a talk-back voice, and at least one of the plurality of speakers is not configured for generating a talk-back voice;
setting a voice input state to an enable state in which voice input is accepted;
inputting sound into the microphone;
generating a simulated mixed voice by setting a filter coefficient in an adaptive filter unit, wherein the adaptive filter unit is in communication with the at least one of the plurality of speakers that is not configured for generating a talk-back voice;
copying only the coefficient set by the adaptive filter unit in communication with the speaker in the plurality of speakers that is not configured for generating a talk-back voice and located closest in proximity to the microphone, into a variable filter unit that is in communication with the at least one of the plurality of speakers that generates a talk-back voice;
extracting a voice input from the sound inputted into the microphone by subtracting the simulated mixed voice;
filtering a mixed voice prior to output by at least of the plurality of speakers; and filtering the simulated talk-back voice prior to output from at least one speaker configured for outputting a talk-back voice;

supplying the extracted voice input to the recognition processor; and supplying the simulated talk-back voice to a gain controller that is separate from and in communication with the adaptive filter unit; and increasing the volume of the talk-back voice to be generated by the at least one of the plurality of speakers based on the sound input into the microphone and the output of the adaptive filter unit, wherein the volume is increased to compensate for the sound input into the microphone such that the talk-back voice can be articulated to a user.

5. The voice recognition system of claim 4, further comprising:

supplying the simulated talk-back voice to a gain controller in communication with the adaptive filter unit; and using the simulated talk-back voice supplied to the gain controller to enhance the articulation of the talk-back voice.

6. The voice recognition system of claim 4, wherein the plurality of speakers is divided into a driver side channel and a non-driver side channel, and the at least one speaker that is configured for generating a talk-back voice is on the driver side channel, and at least one speaker that is not configured for generating a talk-back voice is on the non-driver side channel.

* * * * *

UNITED STATES PATENT AND TRADEMARK OFFICE
CERTIFICATE OF CORRECTION

PATENT NO. : 7,552,050 B2  Page 1 of 1
APPLICATION NO. : 10/835742
DATED : June 23, 2009
INVENTOR(S) : Shuichi Matsumoto et al.

It is certified that error appears in the above-identified patent and that said Letters Patent is hereby corrected as shown below:

On the Title Page

Item (57), line 11, under "ABSTRACT", replace "input tedinto" with --inputted into--.

In column 12, claim 4, line 64, after "to output by at" replace "least of" with --least one of--.

Signed and Sealed this

Tenth Day of November, 2009

David J. Kappos
*Director of the United States Patent and Trademark Office*